United States Patent [19]

Van der Kolk et al.

[11] 4,318,595
[45] Mar. 9, 1982

[54] CONTACT LENS AND METHOD OF MAKING THE SAME

[75] Inventors: Herbert C. Van der Kolk; Martyn W. Davy, both of Auckland, New Zealand

[73] Assignee: Hirst Contact Lens Limited, Auckland, New Zealand

[21] Appl. No.: 70,529

[22] Filed: Aug. 28, 1979

[30] Foreign Application Priority Data

Sep. 4, 1978 [NZ] New Zealand .......................... 188325

[51] Int. Cl.³ .............................................. G02C 7/04
[52] U.S. Cl. ........................... 351/160 H; 351/160 R; 351/177
[58] Field of Search ........................ 351/160 R, 160 H

[56] References Cited

U.S. PATENT DOCUMENTS 3,698,802 10/1972 Baron .................................. 351/160

FOREIGN PATENT DOCUMENTS 2281584 3/1976 France .................................. 351/161

OTHER PUBLICATIONS

Kemmet Muller, Hermann, "On the Improving of Vision by Means of Contact Lenses in Cases of Astigmatism", *Contacts,* Mar. 1976, p. 5+.
Braff, Dolan M.; A New Corneal Lens Design for the Correction of Residual Astigmatism, *The Optometric Weekly,* Jan. 1920, pp. 24–25.

*Primary Examiner*—John K. Corbin
*Assistant Examiner*—Scott J. Sugarman
*Attorney, Agent, or Firm*—Holman & Stern

[57] ABSTRACT

A contact lens, particularly a high minus power anterior surface toric lens, is made having a toric central optical portion without prism and an annular outer portion having prism but without toric effect, the outer portion being truncated in a lower part so that there is upward movement of the center of rotation of the blank and of the center of gravity in a manner such that the center of gravity is in use below the center of rotation, thus assisting if the lens is rotated by lid or eye movement the lens tends to rotate back into correct orientation.

9 Claims, 2 Drawing Figures

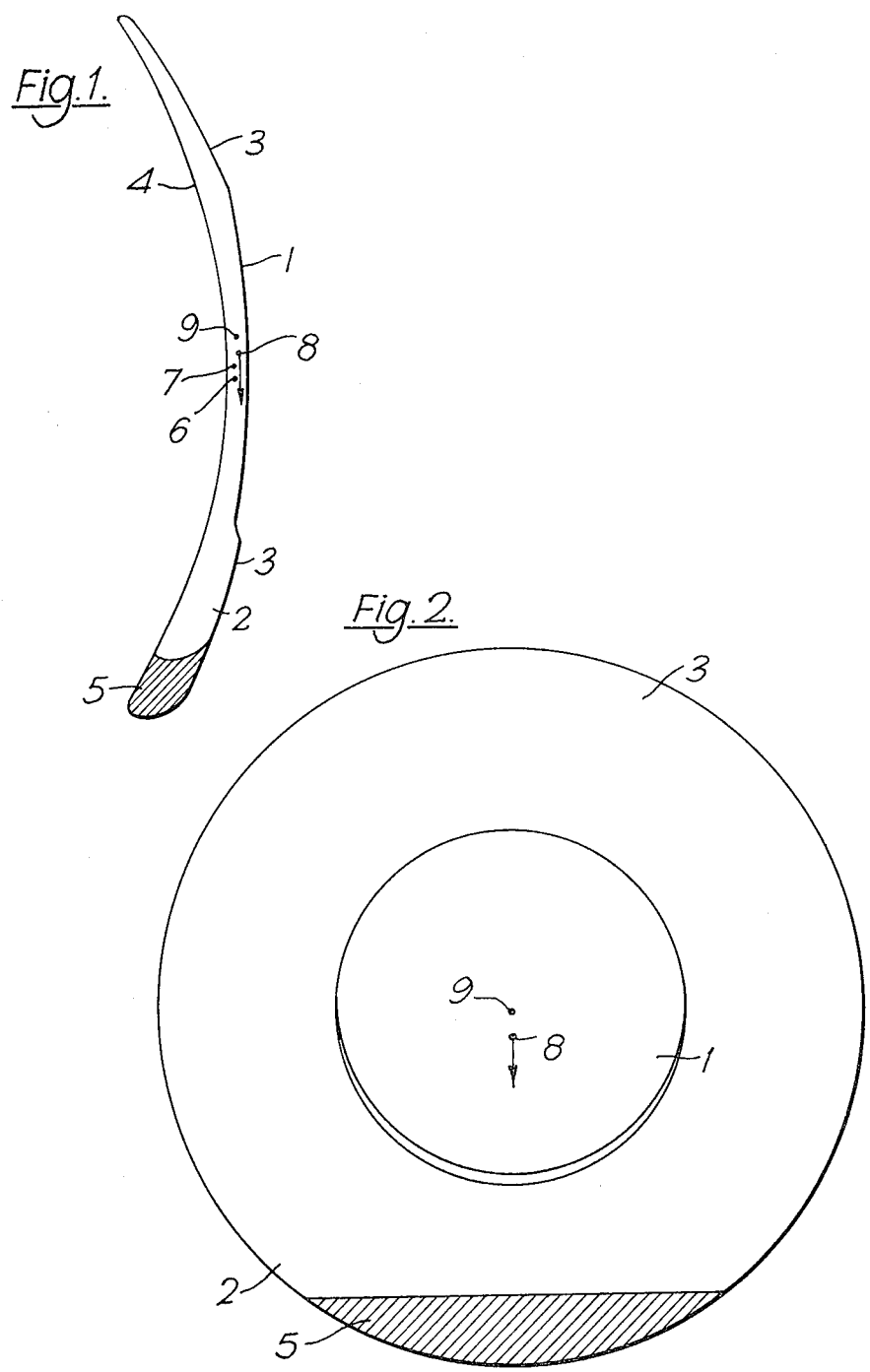

CONTACT LENS AND METHOD OF MAKING THE SAME

BRIEF SUMMARY OF THE INVENTION

This invention relates to contact lenses and/or methods of making the same.

It is an object of the present invention to provide contact lenses and/or methods of making the same which will at least provide the public with a useful choice.

Accordingly in one aspect the invention consists in a method of manufacturing a contact lens having a toric part and a prism part said method comprising the steps of reducing the content and thus the weight of the upper portion of the lens by restricting the portion of the anterior surface of the lens over which the toric part is worked, adjusting the position of the center of gravity of the lens to be lower in use than the center of rotation thereof by working the prism part of the lens over the flange or carrier only of the lenticulated anterior surface and truncating the prism part in a lower area of the lens.

In a further aspect the invention consists in a contact lens having a toric part and a prism part wherein the portion of the anterior surface of the lens over which the toric part is worked is restricted and the prism part of the lens is worked over the flange or carrier only of the lenticulated anterior surface and is truncated in a lower area of the lens, the construction and arrangement being such that the center of gravity of the lens is in use below the center of rotation of the lens.

To those skilled in the art to which this invention relates, many changes in construction and widely differing embodiments and applications of the invention will suggest themselves without departing from the scope of the invention as defined in the appended claims. The disclosures and the description herein are purely illustrative and are not intended to be in any sense limiting.

BRIEF DESCRIPTION OF THE DRAWING

One preferred form of the invention will now be described with reference to the accompanying drawings in which, FIG. 1 is a cross sectional elevation of a high minus power anterior surface toroidal soft lens in the process of being made according to the invention, and FIG. 2 is a front elevation of the lens shown in FIG. 1.

DETAILED DESCRIPTION

This invention relates particularly to high minus power anterior surface toroidal soft lenses as shown in the drawings and using single truncation and prism ballast with substantial reduction of excess weight at the apex of the prism. Such lenses introduce problems relating to stability. The present invention has therefore been designed to obviate or minimise such problems and the lens is accordingly manufactured in the following manner.

The invention aims to produce a toric contact lens which has the toric part 1 on the central optic cap and to provide prism ballast 2 in the annular carrier 3. The lens is made by the process below.

The required convex curve of annular carrier 3 is cut on a contact lens blank in the conventional manner to a predetermined center thickness. The inner concave surface 4 is also produced and shaped in the known way. The blank is then processed by lathing and polishing the annular carrier portion 3 and the toric part 1 so that the central optic zone is provided with a toric optic portion without prism. The carrier outer portion 3 is obtained by mounting the blank so that it spins eccentrically in a radius turning lathe to produce prism but without toric effect. It will be noted from the drawings that the central toric optic portion 1 is limited to a diameter about half the diamter of the lens as shown in FIG. 1 and in practice this limitation is of the order of 8 ½mm.

Following these operations the lower portion 5 of the prism (shown in cross section in both FIGS. 1 and 2) is removed.

The effect of these operations is as follows:

By applying the power of the lens over the central toric portion 1 only there is a considerable reduction in the size of the lower portion 2 even before truncation. As a result the original center of gravity is substantially as shown diagrammatically at 6 and the center of rotation which is substantially the geometric center of the lens is diagrammatically shown at 7. It will be seen that this would give stability but would result in a heavy lens. To reduce the lens size and to improve the stabilizing characteristics of the lens, the lens is truncated by removing the lower portion 5 which results in a change in the center of gravity to the position shown diagrammatically at 8 and a change in the center of rotation to the position shown diagrammatically at 9. As a result there is an upward movement of both the center of gravity and of the center of rotation, but the center of gravity 8 remains below the geometric center i.e. the center of rotation 9 giving the desired result. When the lens is worn by a user any rotational movement of the lens from the position in which the center of gravity 8 is directly below the center of rotation 9 caused e.g. by lid or eye movement results in a correcting force being created which tends to rotate the lens to the correct orientation rather than continuing the rotation to the inverted position. Thus a more stable and satisfactory result is obtained than has hitherto been possible.

When fitting toroidal lenses the present practice is to use a trial lens to assist the fit and predict the performance of the lens. Previous toroidal lens designs required the toric surface to be worked across the whole of the exterior surface. Thus, when the final lens was produced it could differ considerably in geometry from the trial lens. Because in the invention the toric portion is worked only over a limited area of the exterior surface, the similarity of the trail lens to the final lens is considerably increased and thus enables the performance of the final lens to be accurately predicted, ensuring that lenses of widely differing powers are subjectly comfortable, because of the uniformity of the carrier design.

With appropriate modifications the invention is also applicable to lower power lenses and to hard contact lenses.

We claim:

1. A method of manufacturing a contact lens having a lenticular anterior surface with a restricted central zone and a surrounding annular carrier comprising the steps of forming a toric anterior surface over said restricted central zone of the lens and forming an independent prism part of the lens over the carrier only of the lenticular anterior surface so that in use the center of gravity of the lens is below the center of rotation thereof.

2. A method as claimed in claim 1 which includes the step of truncating the annular carrier in the thicker lower area of the lens so that there is an upward movement of the center of gravity and of the center of rotation.

3. A method as claimed in claim 1 or claim 6 as applied to the production of a minus power anterior surface toroidal soft lens.

4. A method as claimed in claim 3 as applied to a contact lens having high minus power.

5. A contact lens comprising a lenticular anterior surface, a restricted central zone and a surrounding annular carrier, a toric anterior surface over said restricted central zone of the lens and an independent prims part of the lens over the carrier only of said lenticular anterior surface so that in use the center of gravity of the lens is below the center of rotation.

6. A contact lens as claimed in claim 5 wherein the lower portion of said carrier is thicker and truncated.

7. A contact lens as claimed in claim 5 or claim 6 wherein said toric part of said lens is restricted to a central area of about 8½ mm in diameter.

8. A contact lens as claimed in either one of claims 5 or 6 wherein the lens is a minus power anterior surface toroidal soft lens.

9. A contact lens as claimed in claim 8 wherein the lens is high minus power.

* * * * *